Jan. 26, 1954  J. R. OISHEI  2,666,941
WINDOW CLEANER
Filed Dec. 2, 1948
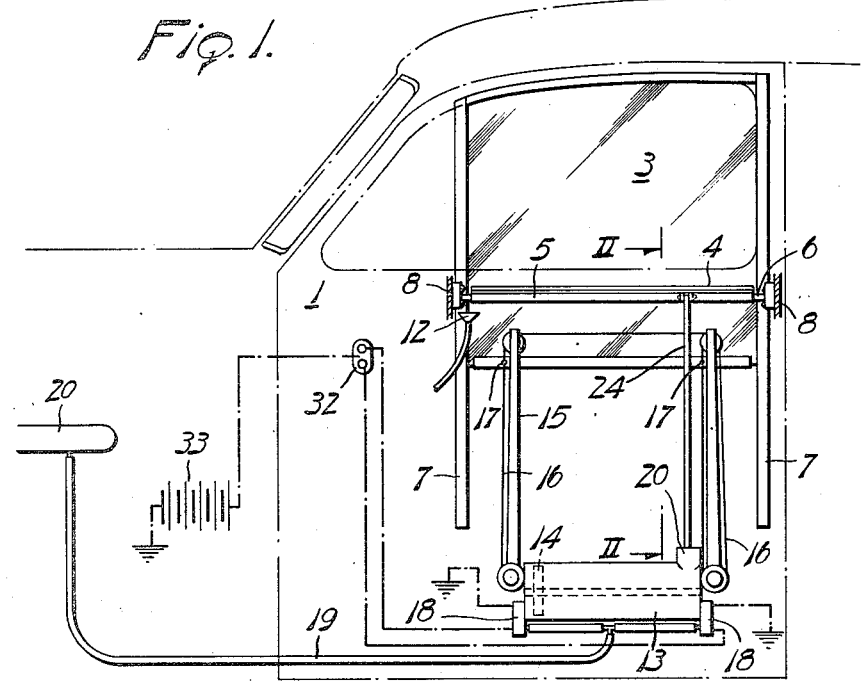
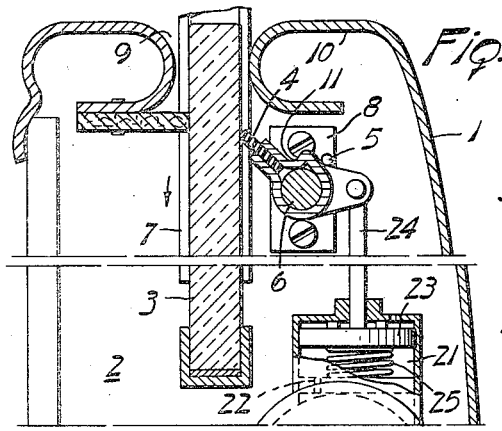
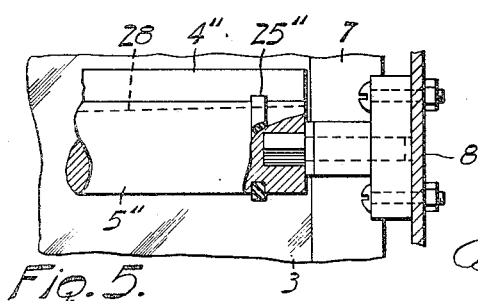
INVENTOR
John R. Oishei
BY
Bean, Brooks, Buckley & Bean
ATTORNEYS Patented Jan. 26, 1954

2,666,941

UNITED STATES PATENT OFFICE 2,666,941

WINDOW CLEANER

John R. Oishei, Buffalo, N. Y., assignor to Trico Products Corporation, Buffalo, N. Y.

Application December 2, 1948, Serial No. 63,137

2 Claims. (Cl. 15—250)

This invention relates to the window cleaning art and more particularly to a means for maintaining clear vision through the side windows of an automobile and while it has particular reference to a side window cleaner, it nevertheless is applicable to the cleaning of vertically adjustable windshields and also the rear windows of motor vehicles. The primary object of the invention is to provide a practical cleaning arrangement which is efficient in operation and one which may be readily concealed within the wall structure of the vehicle so as to be in a position which will permit free and unobstructed use of the window opening when desired.

A further object of the invention is to provide a window cleaning mechanism in which the cleaner is given substantial support to secure an effective squeegee action on the glass panel and thereby reduce the remaining film of moisture thereon to a minimum.

The foregoing and other objects will manifest themselves as the following description progresses, reference being had to the accompanying drawing, wherein Fig. 1 is a diagrammatic view showing the application of the improved window cleaner to an automobile side window;

Fig. 2 is an enlarged sectional view taken about on line 2—2 of Fig. 1;

Fig. 3 is a detailed sectional view through a modified arrangement;

Fig. 4 is a view similar to Fig. 3 showing a further modification of the invention; and Fig. 5 is a fragmentary view similar to Fig. 1, but showing such modified embodiment of Fig. 4.

Referring more particularly to the drawing, the numeral 1 designates a side door of a motor vehicle having a chamber or well 2 into which is lowered the window 3. Adjacent the window is a stationarily mounted wiper comprising a rubber strip or squeegee 4 fitting in a channeled holder or support 5 which is rockably mounted by trunnions 6 on the channeled window guides 7 or their supporting frame 8. This rockable wiper is preferably mounted within the window well to wipe the panel as it slides thereinto and out of the well, or in one direction only, through the slot 9 in the sill 10. The water may be collected in a trough 11, formed in the rockable holder 5, and carried off by conduit 12. For best results the opening and closing movement of the window is a rapid one so that the motorist may clear his lateral field of vision with a minimum exposure to inclement weather. To this end, a motor chamber 13 is fixed within the window well and contains a piston 14 which is connected to the window panel by a flexible power transmitting cable. This cable is supported by pulleys 15 to provide a pair of parallel active flights 16 to which the panel is connected at 17. An operating fluid pressure is selectively admitted to the two ends of the chamber through electrically actuated valves 18, the unconnected end of the chamber being opened to the outside atmosphere whereby the pressure differential will energize the motor. The pressure supply line 19 may lead to the intake manifold 20 or to some other suitable source of either positive or negative pressure, or both. The piston movement imparts a rapid motion to the window. In practice the time interval for opening the window from a fully closed position to a fully opened position has been clocked to less than a second of time. It is therefore apparent that the window does not have to remain open for a long time interval, which fact will keep out inclement weather to a practical extent. The window is thus quickly cleaned by a single stroke of the transparent surface, as the latter moves past the stationary wiper.

Means are provided in Fig. 1 to lift or remove the squeegee from the surface upon the return stroke or closing movement of the window. As illustrated, an auxiliary motor is employed for this purpose, the same comprising a small chamber 21, communicating with the left end of the main motor chamber through passage 22, and a plunger 23 which is directly connected by a rod 24 off center to the rockable wiper for rocking the same. A spring 25 in the small chamber resiliently urges the squeegee 4 normally against the glass 3 but when suction is applied to the left end of the main motor, as viewed in Fig. 1, to raise or close the window the squeegee will be rocked away from the glass.

In the preferred embodiment of Figs. 1 and 2 the wiper is active on the descending movement of the window panel, while in the modified showing of Fig. 3 the squeegee 4' is active upon the window raising stroke, and in Figs. 4 and 5 the squeegee 4'' is active on both the ascending and the descending strokes of the panel.

In the modification of Fig. 3 a rubber tire or wheel 25' is applied to each end of the rockable holder or support 5' for tracking upon the glass panel with a traction driving engagement. Therefore, as the wheels 25' rotate they will cause the holder to rock and resiliently urge the wiping element against the glass. These wheels may frictionally or otherwise clutch the rockable support to rotate thereabout, or they may be secured thereto. The extent of rocking movement may be determined by a stop 26 on the frame 8 overhanging between spaced shoulders 27 on the rockable support.

In the embodiment of Figs. 4 and 5 the squeegee support 5" will rock from the full line position to the broken line position. In the full line position the removed moisture may be conducted away by a trough 28 in the support while in the broken line position, as well as in the embodiment of Fig. 3, a trough 29 will be provided. An opening 30 in each wheel 25" will permit the flow of water to the end of the trough.

The window panel is under the control of means by which it may be lowered and raised in one complete cycle quickly so as to remove excess moisture therefrom. In the illustrated form this control means is shown as a pair of push buttons 32 which are connected in circuit with the control valves 18 and the source of electrical energy 33. By operating the two pushbutton switches 32 in succession, the cyclic movement of the window will be completed in a brief time interval.

The foregoing description has been given in detail for clearness and without thought of limitation since the inventive principles involved are capable of assuming other physical embodiments without departing from the spirit of the invention and the scope of the appended claims.

What is claimed is:

1. A cleaner for slidably adjustable windows of motor vehicles, comprising a wiper mountable upon a fixed axis adjacent the path of window movement, means operable yieldably to urge the wiper against a window surface, a fluid motor operatively connectible to a window for reciprocating the same, and including a motor chamber with a reciprocatory piston therein, combined with fluid operable means in communication with one side only of the motor chamber for lifting the wiper from the glass.

2. A cleaner for a slidably adjustable window of a motor vehicle, comprising in combination with such window, a wiper pivotally mounted upon a fixed axis adjacent the path of window movement, means connected with the wiper to move it toward and from a wiping position on the glass, a fluid motor connected to the window for slidably adjusting the same and including a motor chamber with a piston movable back and forth therein, combined with fluid operable means in communication with one side only of the motor chamber for acting through said first means for moving the wiper in one direction.

JOHN R. OISHEI.

References Cited in the file of this patent

UNITED STATES PATENTS

| Number | Name | Date |
|--------|------|------|
| 609,787 | Capewell | Aug. 30, 1898 |
| 991,140 | Davis | May 2, 1911 |
| 1,032,377 | Cain | July 16, 1912 |
| 1,416,280 | Gazdzicki | May 16, 1922 |
| 1,431,357 | Benkiser | Oct. 10, 1922 |
| 1,534,498 | Bourgon | Apr. 21, 1925 |
| 1,628,669 | Hunter | May 17, 1927 |
| 1,840,201 | Keller | Jan. 5, 1932 |
| 2,160,099 | Zeligman | May 30, 1939 |
| 2,425,391 | Parsons | Aug. 12, 1947 |
| 2,432,799 | Rappl | Dec. 16, 1947 |